(12) United States Patent
Bordes et al.

(10) Patent No.: US 12,388,988 B2
(45) Date of Patent: Aug. 12, 2025

(54) SWITCHABLE INTERPOLATION FILTERS

(71) Applicant: INTERDIGITAL CE PATENT HOLDINGS, SAS, Paris (FR)

(72) Inventors: Philippe Bordes, Laille (FR); Franck Galpin, Thorigne-Fouillard (FR); Tangi Poirier, Thorigné-fouillard (FR); Philippe De Lagrange, Betton (FR)

(73) Assignee: INTERDIGITAL CE PATENT HOLDINGS, SAS, Paris (FR)

( * ) Notice: Subject to any disclaimer, the term of this patent is extended or adjusted under 35 U.S.C. 154(b) by 199 days.

(21) Appl. No.: 17/639,635

(22) PCT Filed: Sep. 2, 2020

(86) PCT No.: PCT/EP2020/074390
§ 371 (c)(1),
(2) Date: Mar. 2, 2022

(87) PCT Pub. No.: WO2021/043786
PCT Pub. Date: Mar. 11, 2021

(65) Prior Publication Data
US 2022/0295057 A1 Sep. 15, 2022

(30) Foreign Application Priority Data

Sep. 4, 2019 (EP) .................... 19306069

(51) Int. Cl.
*H04N 19/117* (2014.01)
*H04N 19/159* (2014.01)
(Continued)

(52) U.S. Cl.
CPC ......... *H04N 19/117* (2014.11); *H04N 19/159* (2014.11); *H04N 19/176* (2014.11); *H04N 19/82* (2014.11)

(58) Field of Classification Search
CPC .... H04N 19/82; H04N 19/117; H04N 19/159; H04N 19/176
See application file for complete search history.

(56) References Cited

U.S. PATENT DOCUMENTS

2004/0062307 A1* 4/2004 Hallapuro ............ H04N 19/159
375/240.16
2006/0294171 A1 12/2006 Bossen et al.
(Continued)

FOREIGN PATENT DOCUMENTS

EP 1530829 5/2005
EP 2747426 6/2014
(Continued)

OTHER PUBLICATIONS

Bross et al., "Versatile Video Coding (Draft 6)", Joint Video Experts Team (JVET) of ITU-T SG 16 WP 3 and ISO/IEC JTC 1/SC 29/WG 11, Document: JVET-O2001-vE, 15th Meeting, Gothenburg, Sweden, Jul. 3-12, 2019, 455 pages.
(Continued)

*Primary Examiner* — Dave Czekaj
*Assistant Examiner* — Shanika M Brumfield
(74) *Attorney, Agent, or Firm* — Ronald Kolczynski

(57) ABSTRACT

A method and apparatus to improve compression efficiency in a video compression scheme enables use of switchable interpolation filters. The interpolation filters are used on multiple partitions of video blocks, enabling better motion compensated prediction and improved video coding efficiency. In one embodiment, an interpolation filter index is derived for triangle partitions of a block from motion information candidate parameters, so that each unidirectional motion compensation can use a different value of interpolation filter index. In another embodiment, an inter-
(Continued)

polation filter index is a function of characteristics, such as shape or area, of video partitions.

18 Claims, 18 Drawing Sheets

(51) Int. Cl.
*H04N 19/176* (2014.01)
*H04N 19/82* (2014.01)

(56) References Cited

U.S. PATENT DOCUMENTS

| | | | | |
|---|---|---|---|---|
| 2008/0247467 | A1 | 10/2008 | Rusanovskyy et al. | |
| 2011/0116546 | A1* | 5/2011 | Guo | H04N 19/523 375/E7.243 |
| 2011/0188571 | A1 | 8/2011 | Maani et al. | |
| 2012/0033728 | A1* | 2/2012 | Cho | H04N 19/124 375/240.03 |
| 2014/0112391 | A1* | 4/2014 | Matsuo | H04N 19/172 375/240.16 |
| 2018/0098066 | A1* | 4/2018 | Lee | H04N 19/59 |
| 2020/0366924 | A1* | 11/2020 | Rusanovskyy | H04N 19/117 |
| 2021/0014478 | A1* | 1/2021 | Seregin | H04N 19/82 |
| 2021/0297658 | A1* | 9/2021 | Lee | H04N 19/159 |
| 2022/0014791 | A1* | 1/2022 | Liu | H04N 19/117 |
| 2022/0070488 | A1* | 3/2022 | Chen | H04N 19/117 |
| 2022/0132111 | A1* | 4/2022 | Liu | H04N 19/82 |

FOREIGN PATENT DOCUMENTS

| | | |
|---|---|---|
| WO | WO2019135419 | 7/2019 |
| WO | WO2019160860 | 8/2019 |

OTHER PUBLICATIONS

Esenlik et al., Non-CE4: Geometrical Partitioning for Inter Blocks, Joint Video Experts Team (JVET) of ITU-T SG 16 WP 3 and ISO/IEC JTC 1/SC 29/WG 11 15th Meeting: Gothenburg, SE, Jul. 3-12, 2019, Document: JVET-O0489-v4.

Henkel, et al., CE4: Switchable interpolation filter (CE4-1.1, CE4-1.2, CE4-1.3, CE4-1.4, CE4-1.5, CE4-1.6, CE4-1.7), Document: JVET-O0057-v2, Joint Video Experts Team (JVET) of ITU-T SG 16 WP 3 and ISO/IEC JTC 1/SG 29/WG 11, 15th Meeting: Gothenburg, SE, pp. 1-10, Jul. 3-12, 2019.

Henkel et al., Non-Ce4: Switched Half-Pel Interpolation Filter, 14. JVET Meeting, Mar. 19, 2019-Mar. 27, 2019, Geneva, (The Joint Video Exploration Team of ISO/IEC JTC1/SC29/WG11 and ITU-T SG.16), No. JVET-N0309, Mar. 25, 2019.

Bordes et al., Non-CE4: Unification of Merge Interpolation Filter (Triangle and Pairwise-Average), 16. JVET Meeting, Oct. 1, 2019-Oct. 11, 2019, Geneva, (The Joint Video Exploration Team of ISO/IEC JTC/SC29/WG11 and ITU-T SG.16), No. JVET-P0340 Sep. 24, 2019.

High Efficiency Video Coding, Series H: Audiovisual and Multimedia Systems Infrastructure of Audiovisual Services—Coding of Moving Video, ITU-T Telecommunication Standardizaton Sector of ITU, H.265 (Apr. 2013), pp. 1-300.

Poirier et al., CE10 Related: Multiple Prediction Unit Shapes, 12. JVET Meeting, Oct. 3, 2018-Oct. 12, 2018, Macao, (The Joint Video Exploration Team of ISO/IEC JTC1/SC29/WG11 and ITU-T SG.16), No. JVET-L0208 Oct. 5, 2018 (Oct. 5, 2018).

\* cited by examiner

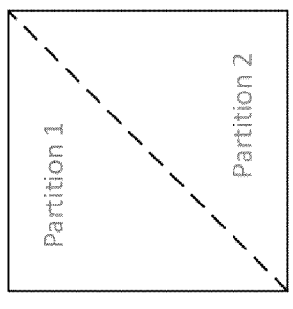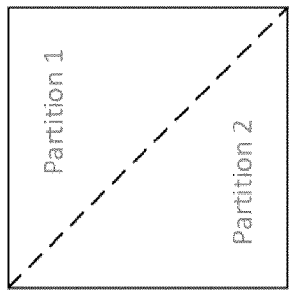
Figure 3

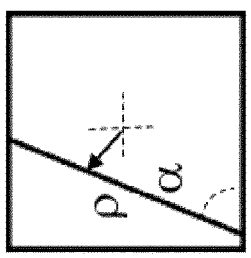
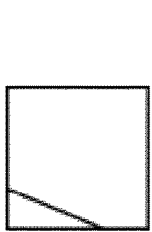
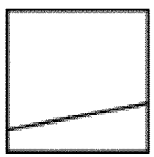
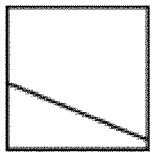
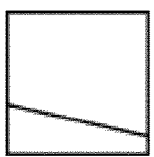
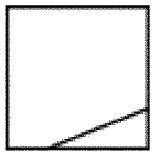
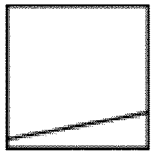
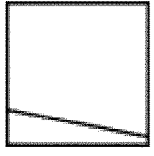
Figure 5

SWITCHABLE INTERPOLATION FILTERS

TECHNICAL FIELD

At least one of the present embodiments generally relates to a method or an apparatus for video encoding or decoding.

BACKGROUND

To achieve high compression efficiency, image and video coding schemes usually employ prediction, including spatial and/or motion vector prediction, and transforms to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized, and entropy coded. To reconstruct the video, the compressed data are decoded by inverse processes corresponding to the entropy coding, quantization, transform, and prediction. A number of coding tools can be used in the process of coding and decoding.

In traditional video coding standards, when a block is coded in inter, the motion vectors are not coded directly but the motion vector difference (MVD) between the motion vector (MV) and the motion vector prediction (MVP). The AMVR tool allows reducing the number of bits for coding MVD by signaling the precision (IMV) of the MVD (and also the precision of the motion vector (MV) in some implementations). Typical IMV values are FULL_PEL, HALF_PEL, or QUARTER_PEL for example. For example, in the Versatile Video Coding standard, IMV is derived from the syntax element "amvr_precision_idx".

SUMMARY

Drawbacks and disadvantages of the prior art may be addressed by the general aspects described herein, which are directed to block shape adaptive intra prediction directions in encoding and decoding.

According to a first aspect, there is provided a method. The method comprises steps for obtaining a filter index corresponding to an interpolation filter; filtering a prediction of at least one video block using said corresponding filter; and, encoding said at least one video block using said filtered prediction.

According to a second aspect, there is provided a method. The method comprises steps for obtaining a filter index corresponding to an interpolation filter; filtering a prediction of at least one video block using said corresponding filter; and, decoding said at least one video block using said filtered prediction.

According to another aspect, there is provided an apparatus. The apparatus comprises a processor. The processor can be configured to encode a block of a video or decode a bitstream by executing any of the aforementioned methods.

According to another general aspect of at least one embodiment, there is provided a device comprising an apparatus according to any of the decoding embodiments; and at least one of (i) an antenna configured to receive a signal, the signal including the video block, (ii) a band limiter configured to limit the received signal to a band of frequencies that includes the video block, or (iii) a display configured to display an output representative of a video block.

According to another general aspect of at least one embodiment, there is provided a non-transitory computer readable medium containing data content generated according to any of the described encoding embodiments or variants.

According to another general aspect of at least one embodiment, there is provided a signal comprising video data generated according to any of the described encoding embodiments or variants.

According to another general aspect of at least one embodiment, a bitstream is formatted to include data content generated according to any of the described encoding embodiments or variants.

According to another general aspect of at least one embodiment, there is provided a computer program product comprising instructions which, when the program is executed by a computer, cause the computer to carry out any of the described decoding embodiments or variants.

These and other aspects, features and advantages of the general aspects will become apparent from the following detailed description of exemplary embodiments, which is to be read in connection with the accompanying drawings.

BRIEF DESCRIPTION OF THE DRAWINGS

FIG. 3 shows an example of a triangle partition based inter prediction.

FIG. 5 shows an example of geometrical partitioning.

DETAILED DESCRIPTION

The following general aspects are in the field of video compression.

Figure 1:
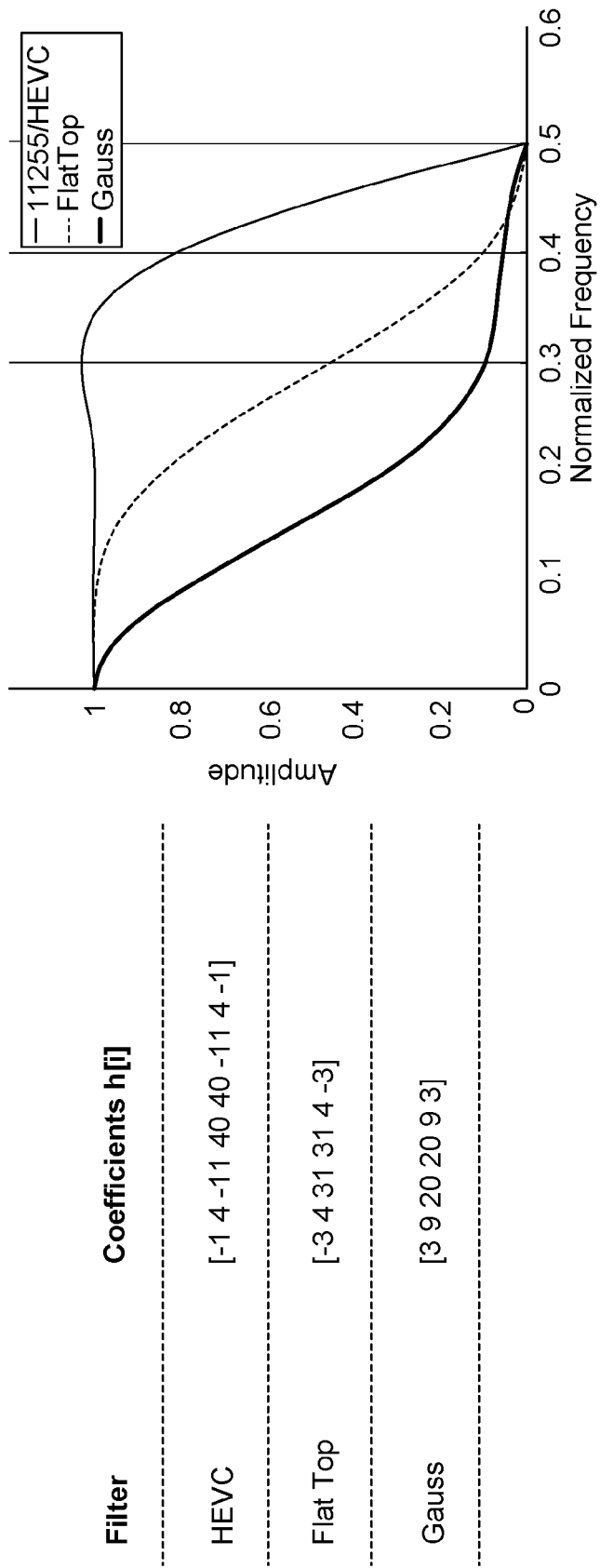
FIG. 1 shows an example of interpolation filters proposed in one video compression scheme.

The principle of switchable interpolation filter (IF) is to improve the motion compensation prediction by selecting the IF (IF-idx) to use for each block prediction. The IFs may differ with smoothing characteristics typically (FIG. 1).

The IF index can be selected per coding unit (CU) and can be derived from the coded "imv" index indicating the resolution of the coded motion vector difference (MVD): if IMV=HALF_PEL, then IF-idx=1 is selected, else IF-idx=0.

In case of Merge, the IF index is not coded explicitly but derived from merge candidate(s).

Figure 2:
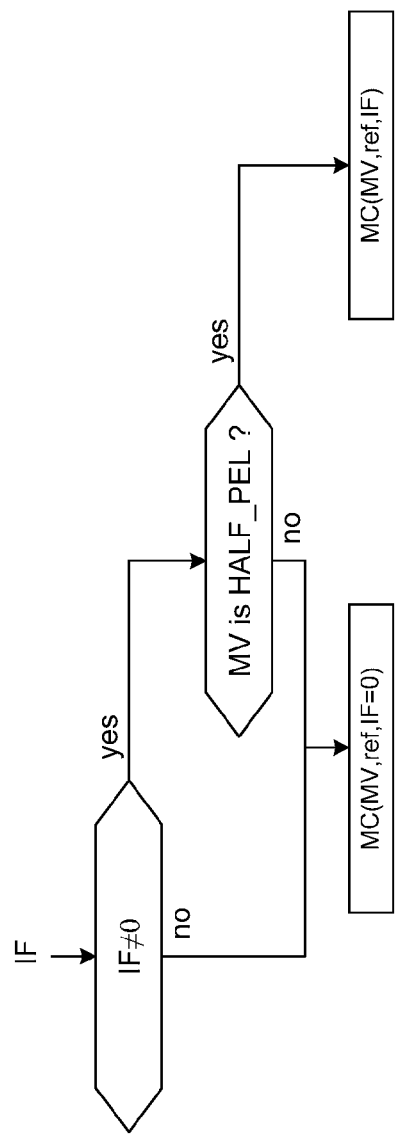
FIG. 2 shows an example flow diagram of motion compensation filtering derivation in a video compression scheme.

In prior work, IF-index value can be one among two filters (IF-0 or IF-1}, but IF-1 can be used for HALF_PEL motion vector values only. Then if IF-index is not equal to zero and the MV horizontal (or vertical) component is not HALF_PEL, then IF-0 is used (FIG. 2).

In the following, we will consider one has N=2 IF filters (IF=0 and IF=1) for simplification but the invention can be easily extended to the case N>2 (IF=0, . . . IF=(N−1)). In this case, one distinguishes the case IF=0 and IF≠0 that correspond to IF=0 and IF=1 in the following. Also, one will call "default filter" the filter IF=0.

Triangle Prediction Unit

In prior works, in merge mode, the triangle inter-prediction allows building a block prediction made of two triangle partitions (FIG. 3). Each triangle partition in the CU is inter-predicted using its own motion; only uni-prediction (unidirectional) is allowed for each partition, that is, each partition has one motion vector and one reference index. The uni-prediction motion constraint is applied to ensure that same as the conventional bi-prediction, only two motion compensated predictions are needed for each CU. If triangle partition mode is used for a current CU, then a flag (split-dir) indicating the direction of the triangle partition (diagonal or anti-diagonal), and two merge indices (cand0 & cand1, one for each partition) are further signaled.

Asymmetrical, Extended-Triangle or Geometry Partitioning Prediction Unit

Figure 4:
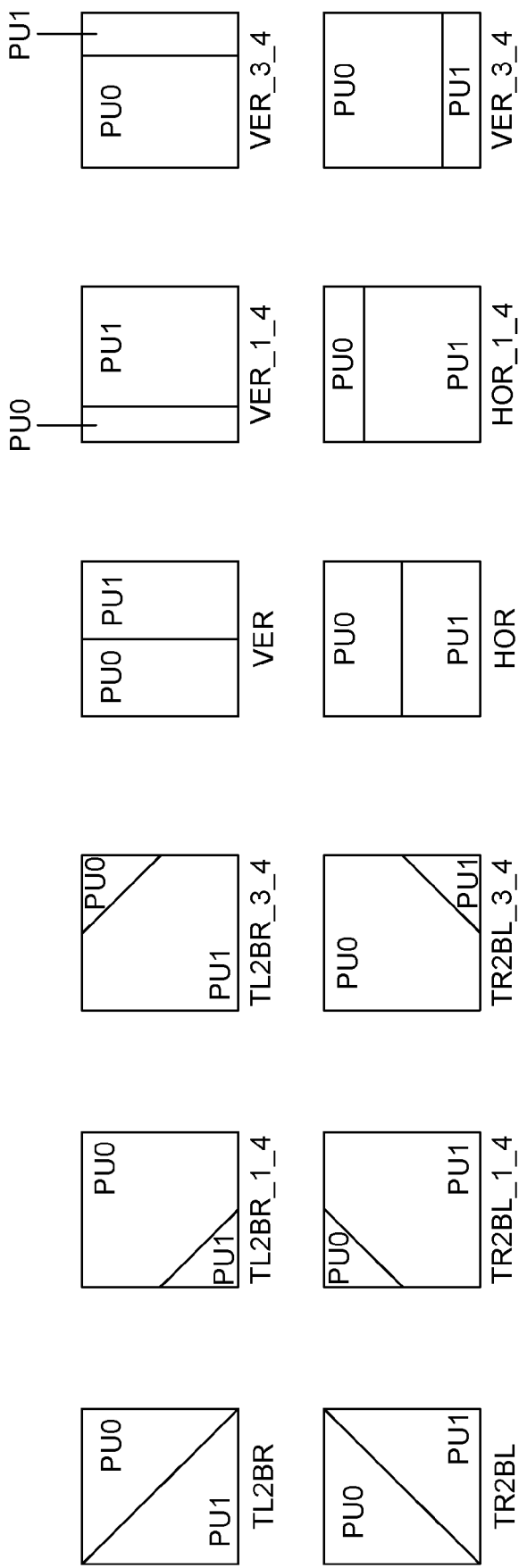
FIG. 4 shows an example of non-diagonal triangle partitioning and asymmetrical partitioning.

As a generalization of triangle-partitioning, the general aspects also apply for a CU partitioned into at least two prediction units (PUs) such as for example non-diagonal triangle partitioning (as proposed in a prior work and depicted in FIG. 4—left), asymmetrical partitioning (as proposed in a prior work or HEVC and depicted in FIG. 4—FIG. 4 right) or geometrical partitioning (as proposed in a prior work and depicted in FIG. 5).

Figure 6:
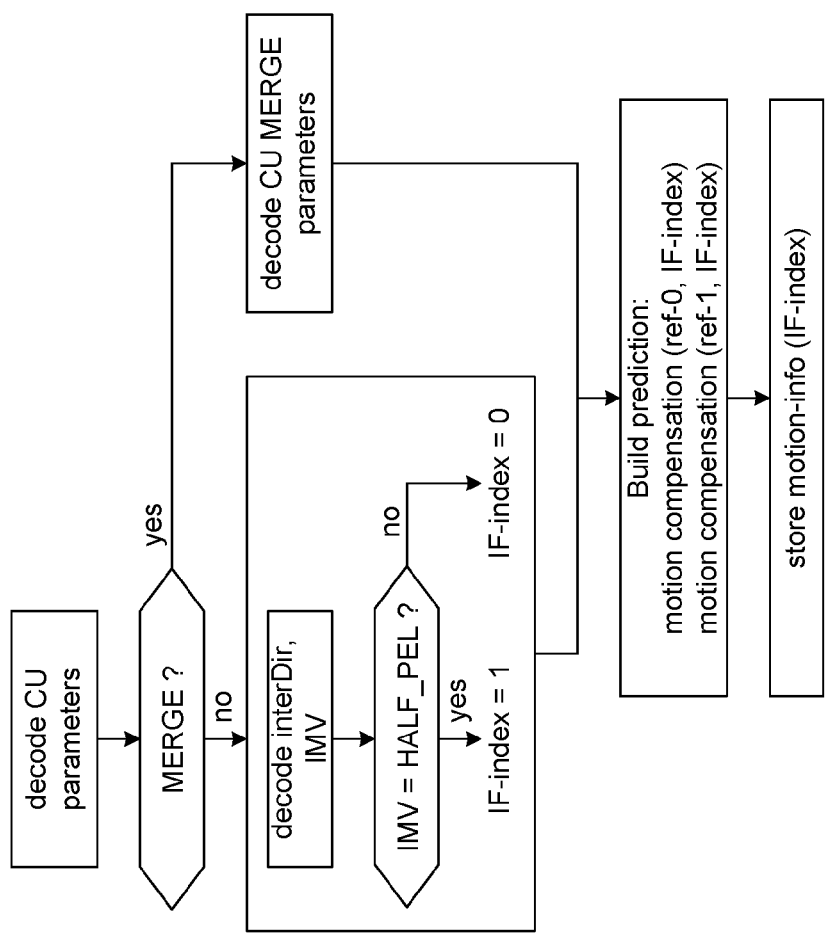
FIG. 6 shows an example of derivation and use of the IF index.

FIG. 6 depicts the derivation of IF-index in case of AMVR and merge modes. In case the precision (IMV) of the coded MVD is explicitly coded, the IF-index is derived from the value of IMV. In case of bi-prediction (interDir=3), both motion-compensations are applied with same IF-index value.

Figure 7:
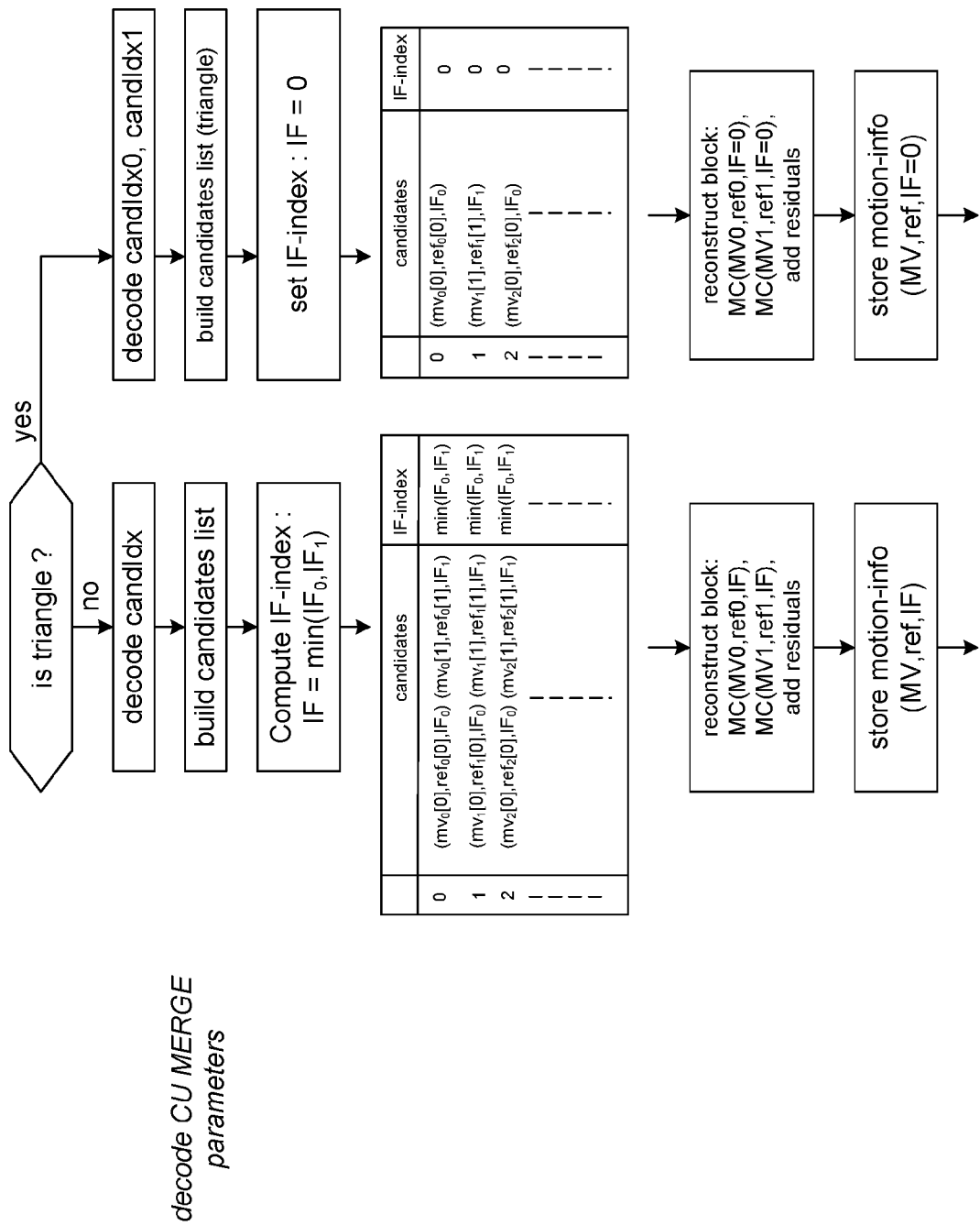
FIG. 7 shows another example of the derivation and use of the IF index.

FIG. 7 depicts the derivation of "IF-index" in case of merge mode. A list of coding candidates' parameters is built from neighboring reconstructed CUs. A candidate index is explicitly coded and allows selecting the candidate parameter to use. The candidate parameters may contain MV, reference and IF-index typically. As for non-merge cases, in case the CU is bi-predicted, one single value of IF-index is used. For some cases (ex: triangle, affine . . . ), the IF-index is forced to be default (IF=0).

Figure 8:
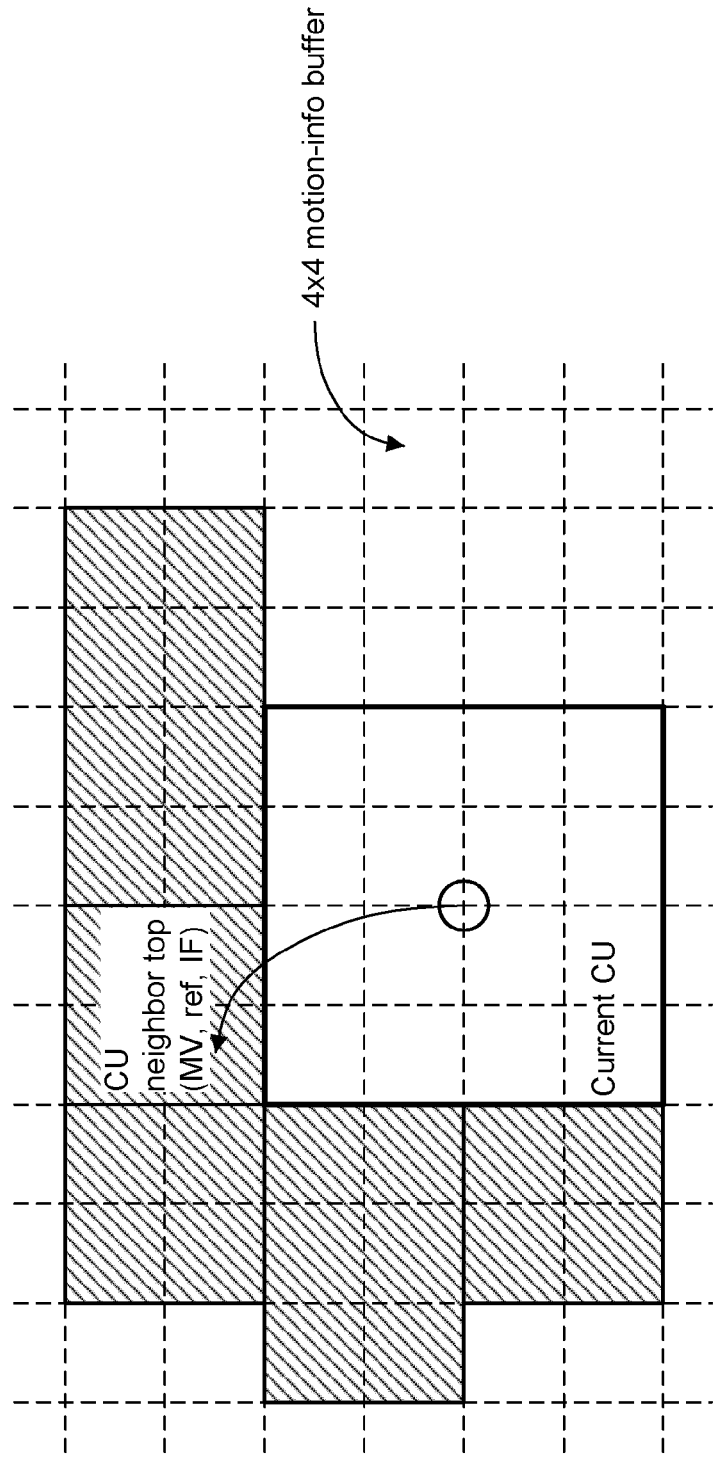
FIG. 8 shows one embodiment of a co-located storage buffer for motion information.

For each CU, the value of the IF-index is stored in a co-located storage buffer at 4×4 resolution typically (FIG. 8) to be possibly further used for building neighboring candidates lists. To avoid memory storage burden, one single IF-index is stored. This storage allows for deriving IF-index for subsequent CUs coded in merge mode, at the building candidates' parameters list stage. Then, in other works, in case of bi-prediction, the stored value is IF=min(IF0,IF1) where IF0 and IF1 are the values of the IF-index for the reference List-0 and reference List-1.

Problem-1: Triangle Use IF-0 Only

Figure 9:
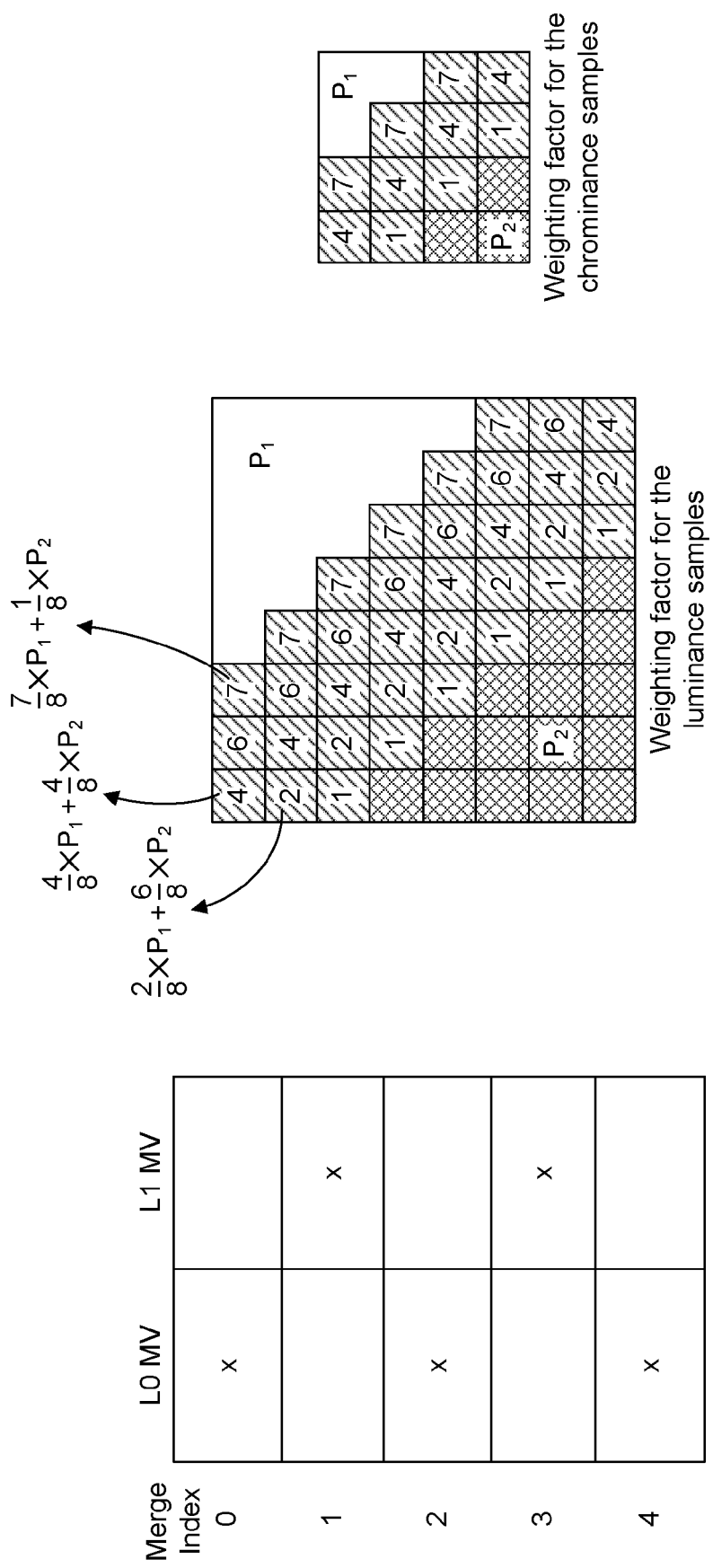
FIG. 9 shows an example of unidirectional prediction motion vector selection for triangle partition mode (left), and weighting factors for samples in a diagonal (right).

In case of triangle coding, the unidirectional prediction candidate list has up to 6 unidirectional prediction candidates. The list is derived directly from the merge candidate list constructed according to the extended merge prediction process. Denote n as the index of the unidirectional prediction motion in the triangle unidirectional prediction candidate list. The LX motion vector of the n-th extended merge candidate, with X equal to the parity of n, is used as the n-th unidirectional prediction motion vector for triangle partition mode. These motion vectors are marked with "x" in FIG. 9. In case a corresponding LX motion vector of the n-th extended merge candidate does not exist, the L(1−X) motion vector of the same candidate is used instead as the unidirectional prediction motion vector for triangle partition mode.

The samples of the PU prediction block are mainly composed of unidirectional predictions, except for the samples in the diagonal part which are composed of the two weighted unidirectional predictions (blending). Then it can be counterproductive using bi-prediction rules regarding IF-index in the case of triangle mode.

Problem-2:

For bi-prediction, the IF-index is shared for the two uni-directional predictions. Then, this may be counter-productive if one MV is HALF_PEL and the other is not and IF is equal to 1.

Figure 10:
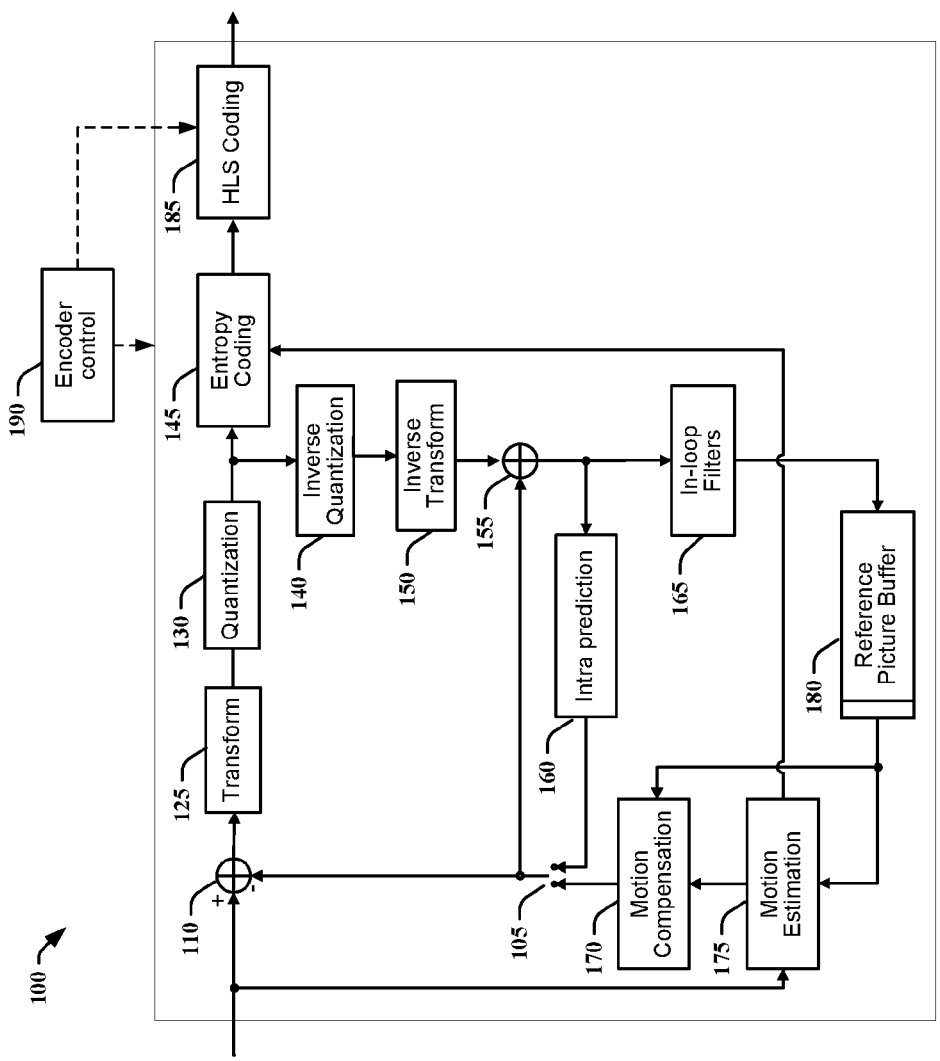
FIG. 10 shows a typical standard, generic, video compression scheme in which the described embodiments may be implemented.
Figure 11:
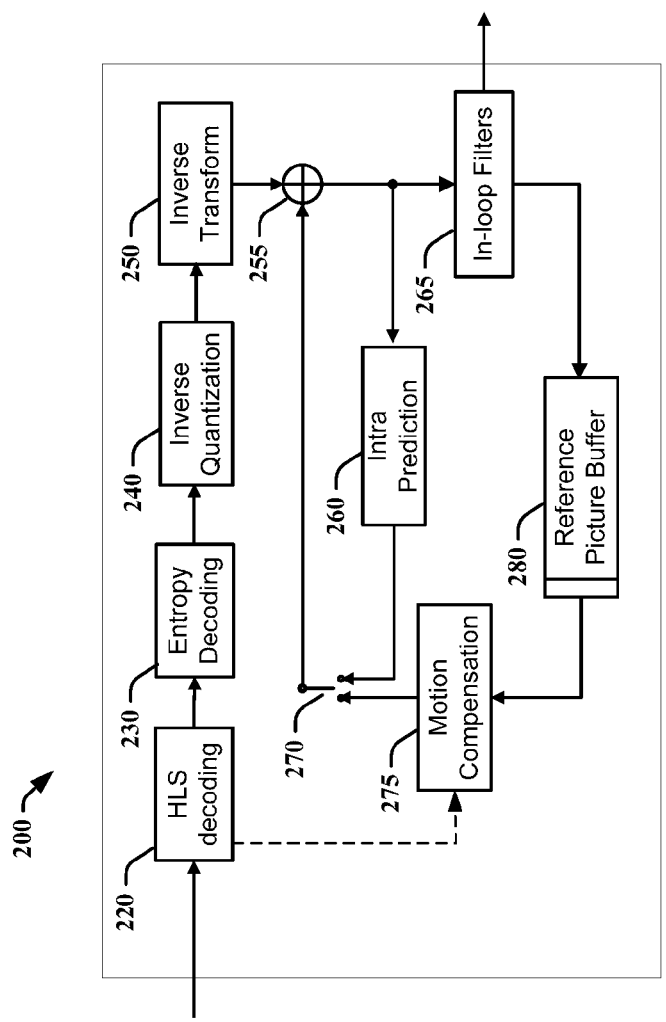
FIG. 11 shows a typical standard, generic, video decompression scheme in which the described embodiments may be implemented.

The impacted codec modules are the encoder motion compensation (170) and reference picture buffer (motion-info) (180) of FIG. 10 and the corresponding decoder motion compensation (275) and reference picture buffer (motion-info) (280) of FIG. 11.

Embodiment-1

In case of motion compensation process can select various interpolation filters and CU decoding implies performing two motion-compensation with two different MVs and/or reference pictures (ex/bi-prediction or triangle or geometry), one may apply value for IF-index (IF-0 and IF-1) that may be different.

Embodiment-2

Figure 12:
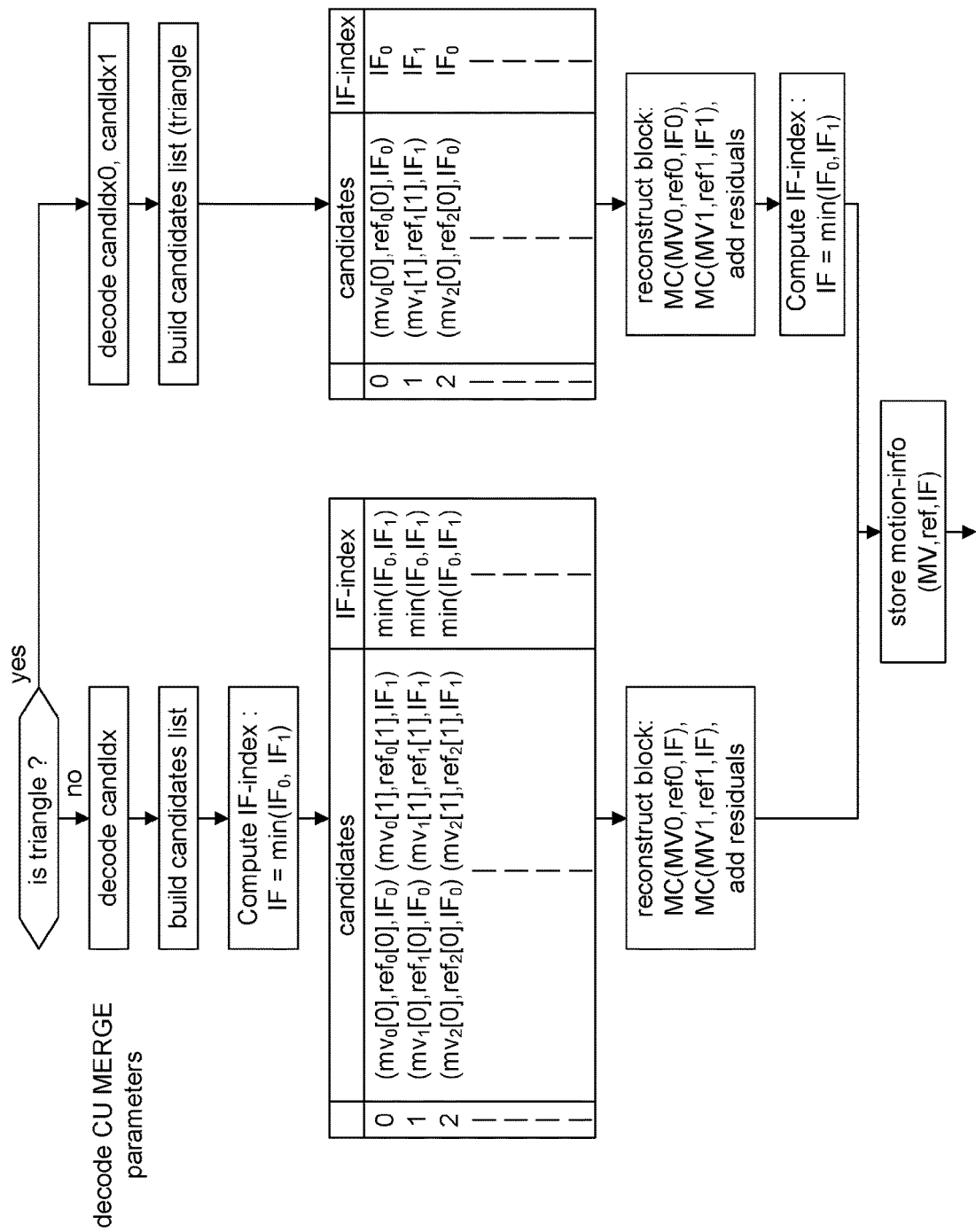
FIG. 12 shows one proposed derivation use and storage of IF index information for bi-partition and/or bi-prediction using the general aspects described herein.

(Emb-1)+in case the CU decoding mode is "triangle", the value of IF-index for each triangle partition is derived from each motion-info candidate parameters so that each uni-directional motion compensation may use different value of IF-index (FIG. 12).

Embodiment-3

(Emb-1 or Emb-2) where one single value of IF-index is stored in the motion-info buffer which is computed as min(IF-0, IF-1) (FIG. 12) or max (IF-0, IF-1).

In a variant, the single value of IF-index is function of the two-partitions shapes.

a) The function depends on the relative area ration between the two partitions. For example, if area-0>area-1, then IF-index=IF-0.
b) Or the function depends on the two-areas positions. For example, if area-1 is below area-0 (ex: the 3 bottom-right partitions in FIG. 6) then IF-index=IF-1. Indeed, this function will be well adapted in case (majority of) the subsequent CUs to decode are below of current CU. In another example, if area-1 is at the right of area-0 (ex: the 3 top-right partitions in FIG. 6) then IF-index=IF-1. Indeed, this function will be well adapted in case (majority of) the subsequent CUs to decode are at the right of current CU.

Embodiment-4

The spanning of the IF-index values into the motion-info buffer is made as for the spanning of the MV and ref-idx parameters. In case the bi-partitioning areas are not entirely overlapping (ex: triangle or geometry partitioning) the value of IF-index that is stored correspond to the uni-directional motion-compensated area, at the motion-info buffer resolution (ex: 8×8).

In the motion-info buffer regions where some PU samples have been computed with more than one uni-directional motion compensation, then the spanned IF-index value is equal to min(IF-0, IF-1) or max(IF-0, IF-1).

Figure 13:
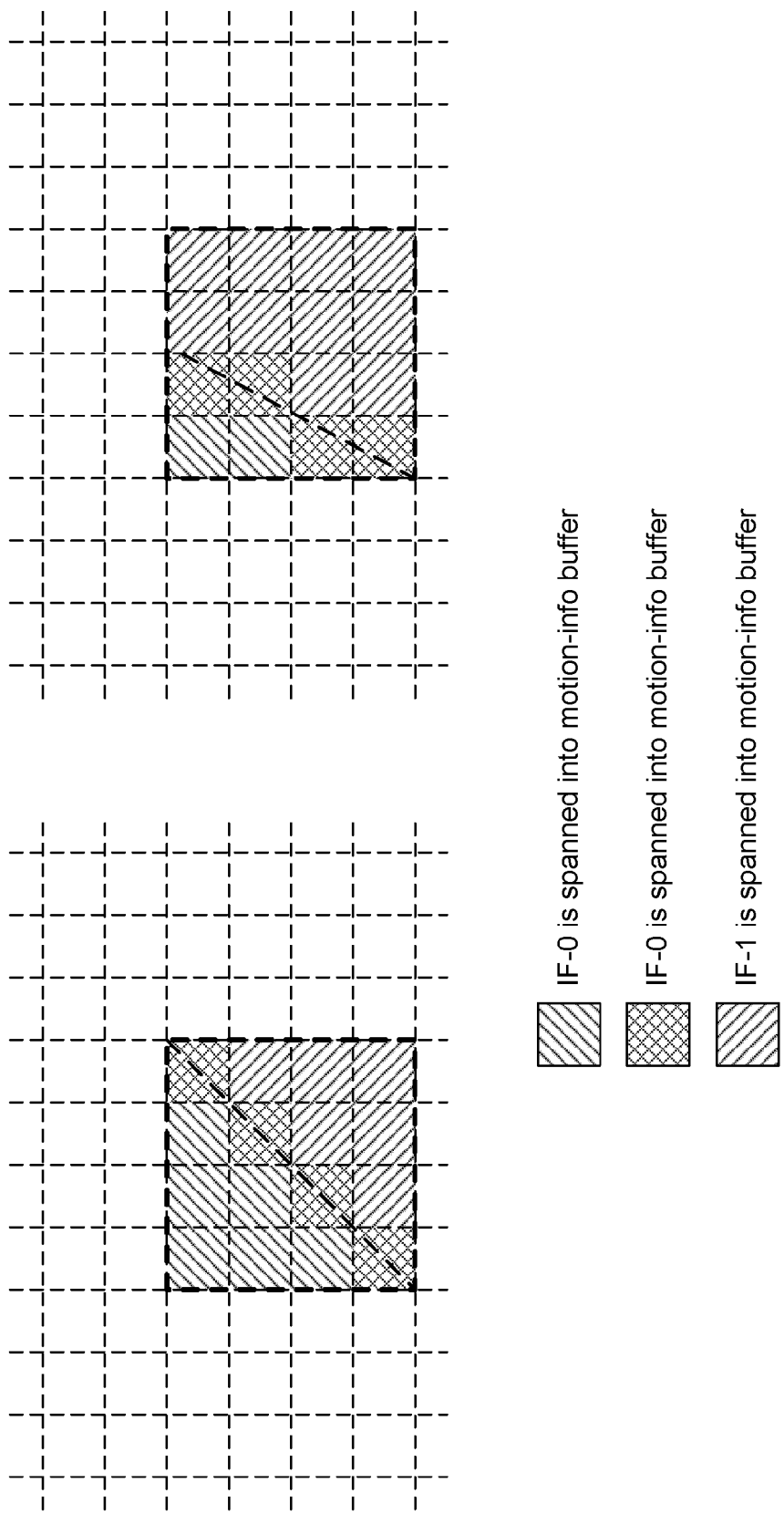
FIG. 13 shows an example of storage of IF index in the motion-info buffer using the general aspects described herein.

In a variant, and similarly as in Embodiment 3, the spanned value of IF-index is function of the relative portion of the two-partitions shapes (FIG. 13).

Embodiment-5

(Emb-1 or Emb-2) is applied only in case the bi-partitioning areas are not entirely overlapping (ex: apply for triangle or geometrical PU partitioning but excludes classical bi-prediction).

The rationale is because if (all) the prediction samples are averaged together, then the benefit of switchable interpolation filter is reduced by the bi-partition weighting.

Embodiment-6

Figure 14:
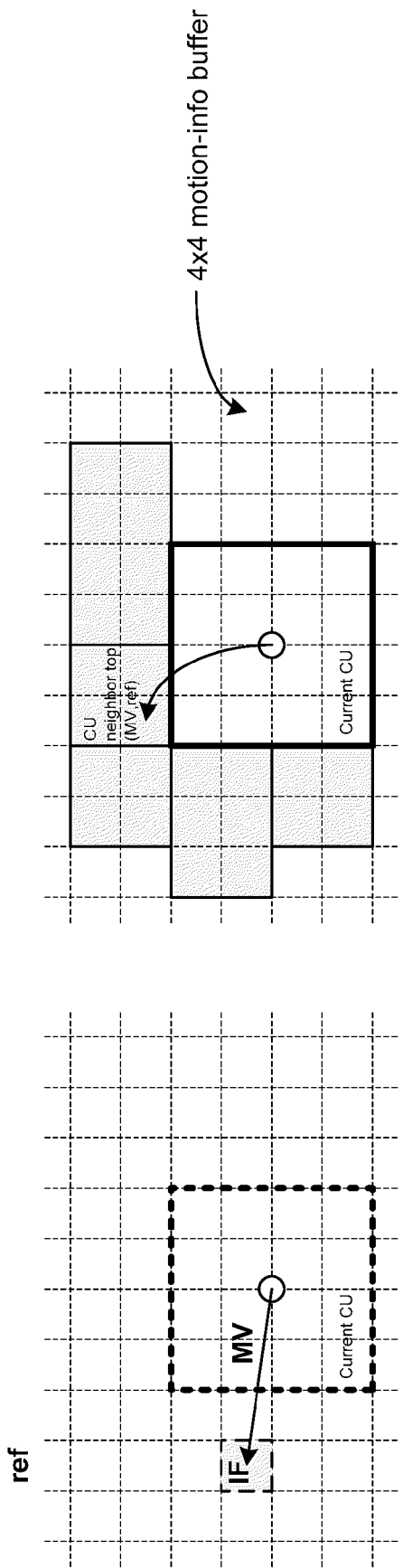
FIG. 14 shows an example of IF derivation from a value stored in the motion-information of the reference picture buffer.

In a variant, the value of IF-index is retrieved from the motion-info buffer of a reference picture, for example, a reference picture at position (current-CU+MV) (FIG. 14).

In a variant, the value of IF is retrieved only if the position (current-CU+MV) is inside a given restricted area, typically the CTU of the current CU.

Embodiment-7

In case of generalized bi-prediction (also known as GBI or bi-prediction weighted average BPWA or bi-prediction with CU-level weights BCW), the bi-prediction weighting may use non-equal weights (w0,w1) for averaging the two uni-predictions:

$$bi\text{-}pred(x)=w0.pred0(x)+w1.pred1(x)$$

It is proposed to derive the value of IF-index for motion compensation and/or for storage in motion-info buffer with a function depending on the values of (w0;w1). For examples:

a) if w0>w1, then IF=IF0, else if w1>w0 then IF=IF1, else IF=min(IF0,IF1)
b) or if w0=w1, then IF=0

Figure 15:
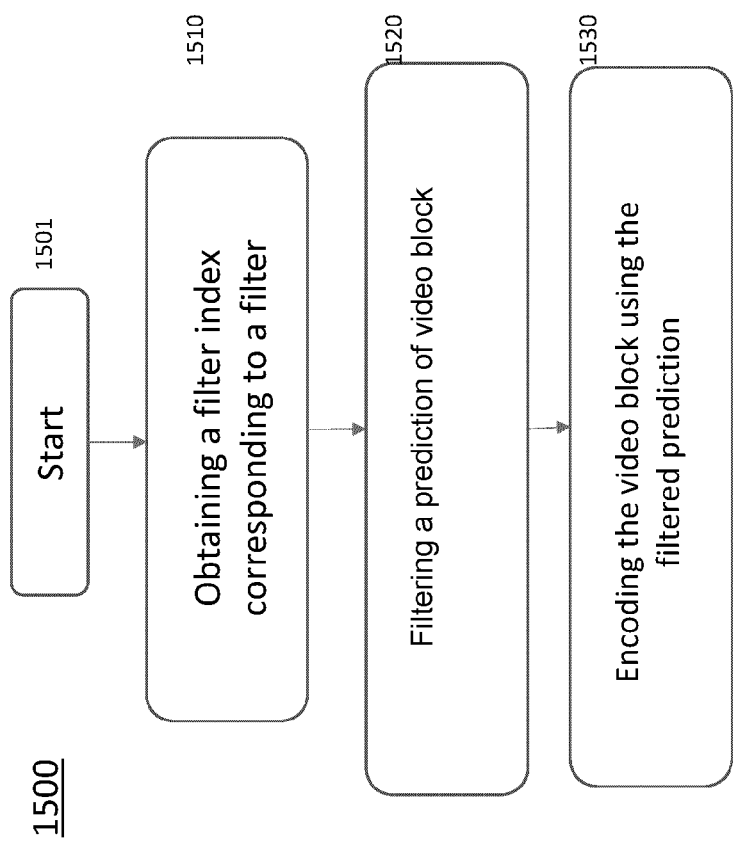
FIG. 15 shows one embodiment of a method of encoding using the general aspects described herein.

One embodiment of a method 1500 under the general aspects described here is shown in FIG. 15. The method commences at start block 1501 and control proceeds to block 1510 for obtaining a filter index corresponding to an interpolation filter. Control proceeds from block 1510 to block 1520 for filtering a prediction of at least one video block using said corresponding filter. Control proceeds from block 1520 to block 1530 for encoding said at least one video block using said filtered prediction.

Figure 16:
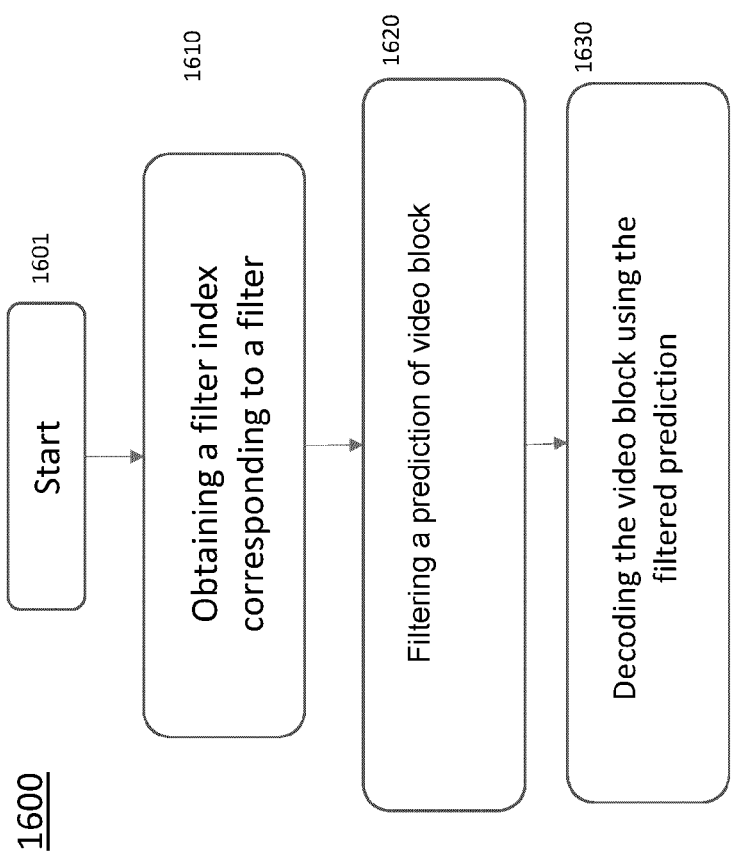
FIG. 16 shows one embodiment of a method of decoding using the general aspects described herein.

One embodiment of a method 1600 under the general aspects described here is shown in FIG. 16. The method commences at start block 1601 and control proceeds to block 1610 for obtaining a filter index corresponding to an interpolation filter. Control proceeds from block 1610 to block 1620 for filtering a prediction of at least one video block using said corresponding filter. Control proceeds from block 1620 to block 1630 for decoding said at least one video block using said filtered prediction.

Figure 17:
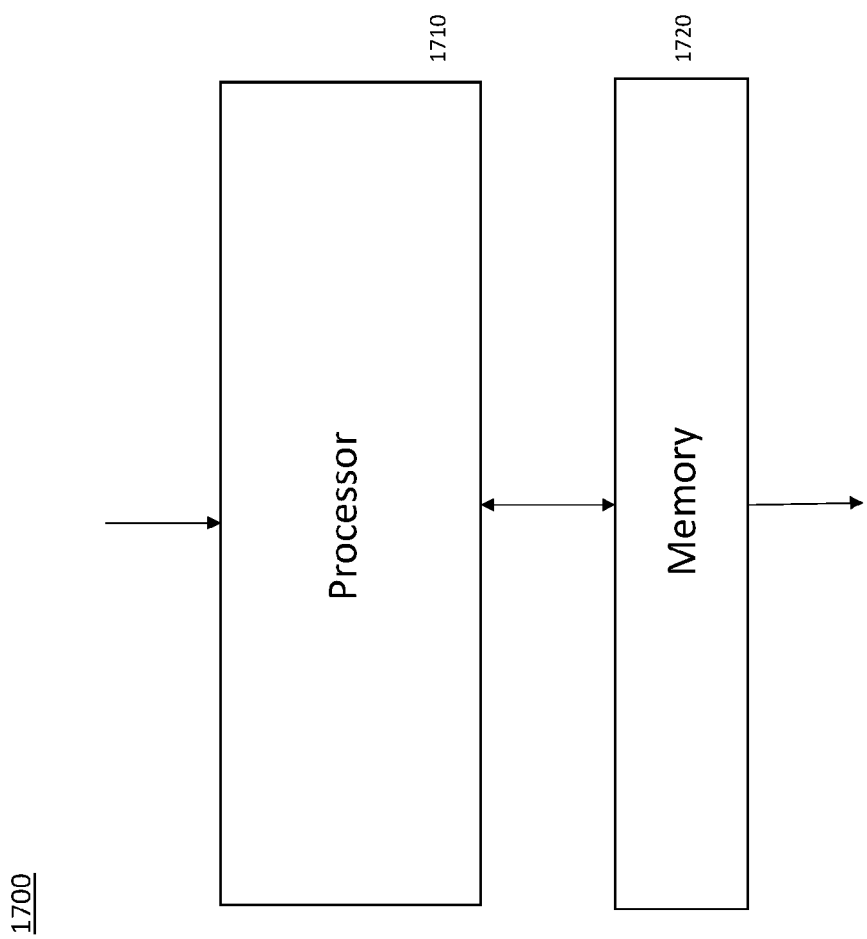
FIG. 17 shows one embodiment of an apparatus for encoding or decoding using the general aspects described herein.

FIG. 17 shows one embodiment of an apparatus 1700 for compressing, encoding or decoding video using interpolation filters. The apparatus comprises Processor 1710 and can be interconnected to a memory 1720 through at least one port. Both Processor 1710 and memory 1720 can also have one or more additional interconnections to external connections.

Processor 1710 is also configured to either insert or receive information in a bitstream and, either compressing, encoding or decoding using interpolation filters.

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 18:
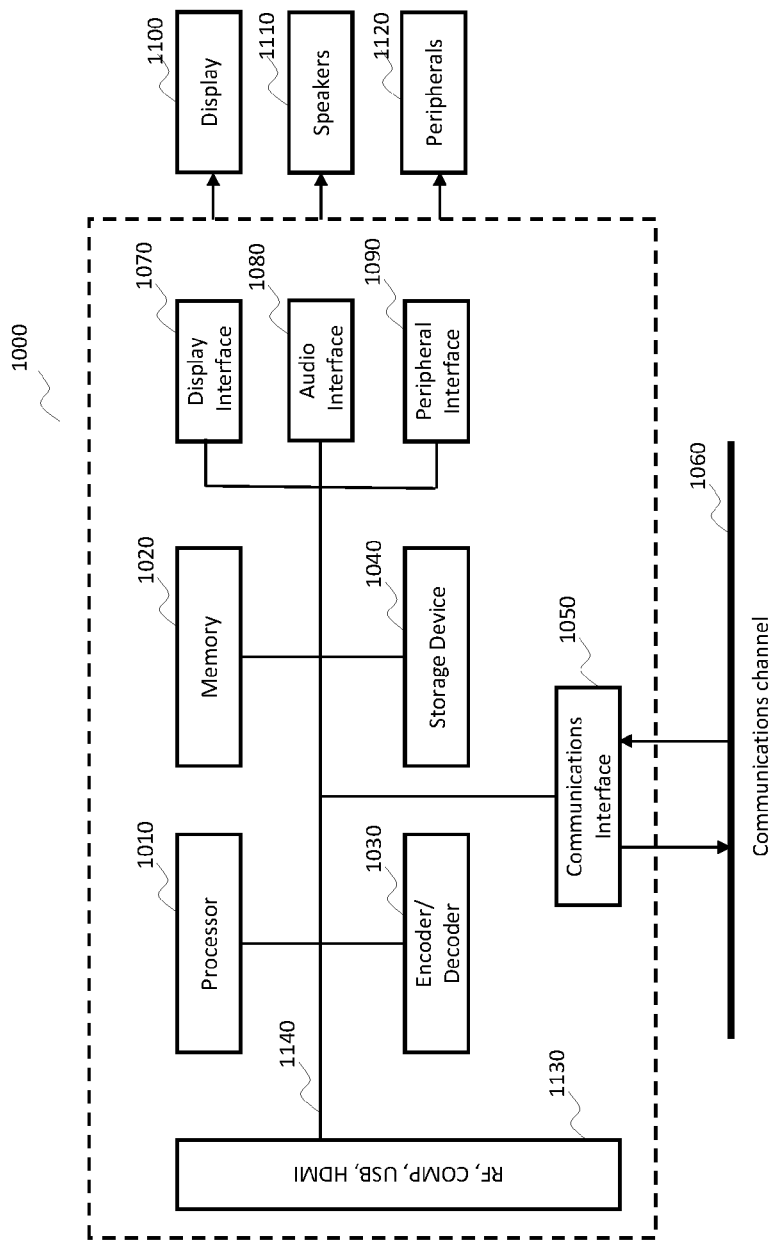
FIG. 18 shows one embodiment of a system for encoding or decoding using the general aspects described herein.

The aspects described and contemplated in this application can be implemented in many different forms. FIGS. 10, 11, and 18 provide some embodiments, but other embodiments are contemplated and the discussion of FIGS. 10, 11, and 18 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this application can be used to modify modules, for example, the intra prediction, entropy coding, and/or decoding modules (160, 360, 145, 330), of a video encoder 100 and decoder 200 as shown in FIG. 10 and FIG. 11. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Various numeric values are used in the present application. The specific values are for example purposes and the aspects described are not limited to these specific values.

FIG. 10 illustrates an encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 11 illustrates a block diagram of a video decoder 200. In the decoder 200, a bitstream is decoded by the decoder elements as described below. Video decoder 200 generally performs a decoding pass reciprocal to the encoding pass as described in FIG. 10. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 18 illustrates a block diagram of an example of a system in which various aspects and embodiments are implemented. System 1000 can be embodied as a device including the various components described below and is configured to perform one or more of the aspects described in this document. Examples of such devices include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 18, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement, for example, an internal bus as known in the art, including the Inter-IC (I2C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or another device. The display 1100 can also be integrated with other components (for example, as in a smart phone), or separate (for example, an external monitor fora laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments may refer to parametric models or rate distortion optimization. In particular, during the encoding process, the balance or trade-off between the rate and distortion is usually considered, often given the constraints of computational complexity. It can be measured through a Rate Distortion Optimization (RDO) metric, or through Least Mean Square (LMS), Mean of Absolute Errors (MAE), or other such measurements. Rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of transforms, coding modes or flags. In this way, in an embodiment the same transform, parameter, or mode is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments, across various claim categories and types. Features of these embodiments can be provided alone or in any combination. Further, embodiments can include one or more of the following features, devices, or aspects, alone or in any combination, across various claim categories and types:

A process or device to encode or decode video data using low frequency non-separable transforms with multiple transform selection.

A process or device to encode or decode video data using low matrix-based intra-prediction with multiple transform selection.

A process or device to encode or decode video data using low frequency non-separable transforms with implicit multiple transform selection.

A process or device to encode or decode video data using low matrix-based intra-prediction with implicit multiple transform selection.

A bitstream or signal that includes one or more of the described syntax elements, or variations thereof.

A bitstream or signal that includes syntax conveying information generated according to any of the embodiments described.

Creating and/or transmitting and/or receiving and/or decoding according to any of the embodiments described.

A method, process, apparatus, medium storing instructions, medium storing data, or signal according to any of the embodiments described.

Inserting in the signaling syntax elements that enable the decoder to determine coding mode in a manner corresponding to that used by an encoder.

Creating and/or transmitting and/or receiving and/or decoding a bitstream or signal that includes one or more of the described syntax elements, or variations thereof.

A TV, set-top box, cell phone, tablet, or other electronic device that performs transform method(s) according to any of the embodiments described.

A TV, set-top box, cell phone, tablet, or other electronic device that performs transform method(s) determination according to any of the embodiments described, and that displays (e.g. using a monitor, screen, or other type of display) a resulting image.

A TV, set-top box, cell phone, tablet, or other electronic device that selects, bandlimits, or tunes (e.g. using a tuner) a channel to receive a signal including an encoded image, and performs transform method(s) according to any of the embodiments described.

A TV, set-top box, cell phone, tablet, or other electronic device that receives (e.g. using an antenna) a signal over the air that includes an encoded image, and performs transform method(s).

The invention claimed is:

1. A method, comprising:
obtaining a filter index corresponding to an interpolation filter, wherein the interpolation filter is a sub-pixel position interpolation filter for motion compensated prediction;
filtering a prediction of at least one video block using said corresponding filter wherein said video block is partitioned into at least two portions having corresponding filter indices, wherein filtering of each of the at least two portions is performed with corresponding filters, and, when encoding mode is triangle, the value of filter index for each triangle partition is derived from each motion information candidate parameters, and a single value of filter index is stored in a motion information buffer which is computed as a minimum or maximum of the corresponding filter indices, and
wherein said prediction is obtained using two motion-compensations with two different motion vectors or references; and,
encoding said at least one video block using said filtered prediction.

2. The method of claim 1, wherein a triangle inter prediction is used and said filter index is obtained from motion candidate parameters and uni-directional motion compensation can use a separate filter index.

3. The method of claim 1, wherein said filter index is a function of characteristics of two or more partitions comprising said video block.

4. A non-transitory computer readable medium containing data content generated according to the method of claim 1, for playback using a processor.

5. A non-transitory computer readable medium storing a computer program product comprising data generated according to the method of claim 1, for playback using a processor.

6. An apparatus, comprising:
a processor, configured to perform:
obtaining a filter index corresponding to an interpolation filter, wherein the interpolation filter is a sub-pixel position interpolation filter for motion compensated prediction;
filtering a prediction of at least one video block using said corresponding filter wherein said video block is partitioned into at least two portions having corresponding filter indices, wherein filtering of each of the at least two portions is performed with corresponding filters, and, when encoding mode is triangle, the value of filter index for each triangle partition is derived from each motion information candidate parameters, and a single value of filter index is stored in a motion information buffer which is computed as a minimum or maximum of the corresponding filter indices, and
wherein said prediction is obtained using two motion-compensations with two different motion vectors or references; and,
encoding said at least one video block using said filtered prediction.

7. The apparatus of claim 6, wherein said filter index is a function of relative portions of two or more partitions comprising said video block.

8. The apparatus of claim 6, wherein a different filtering index is applied when bi-partitioning areas do not overlap.

9. The apparatus of claim 6, wherein a filter index is obtained from motion information of a reference picture.

10. The apparatus of claim 6, wherein bi-prediction is performed using a weighted prediction and a filter index is a function of weights used in said weighted prediction.

11. A method, comprising:
obtaining a filter index corresponding to an interpolation filter, wherein the interpolation filter is a sub-pixel position interpolation filter for motion compensated prediction;
filtering a prediction of at least one video block using said corresponding filter wherein said video block is partitioned into at least two portions having corresponding filter indices, wherein filtering of each of the at least two portions is performed with corresponding filters, and, when decoding mode is triangle, the value of filter index for each triangle partition is derived from each motion information candidate parameters, and a single value of filter index is stored in a motion information buffer which is computed as a minimum or maximum of the corresponding filter indices, and
wherein said prediction is obtained using two motion-compensations with two different motion vectors or references; and,
decoding said at least one video block using said filtered prediction.

12. A non-transitory computer readable medium storing a computer program product comprising instructions which, when the program is executed by a computer, cause the computer to carry out the method of claim 11.

13. The method of claim 11, wherein a triangle inter prediction is used and said filter index is obtained from motion candidate parameters and uni-directional motion compensation can use a separate filter index.

14. The method of claim 11, wherein said filter index is a function of characteristics of two or more partitions comprising said video block.

15. An apparatus, comprising:
a processor, configured to perform:
obtaining a filter index corresponding to an interpolation filter, wherein the interpolation filter is a sub-pixel position interpolation filter for motion compensated prediction;
filtering a prediction of at least one video block using said corresponding filter wherein said video block is partitioned into at least two portions having corresponding filter indices, wherein filtering of each of the at least two portions is performed with corresponding filters, and, when decoding mode is triangle, the value of filter index for each triangle partition is derived from each motion information candidate parameters, and a single value of filter index is stored in a motion information buffer which is computed as a minimum or maximum of the corresponding filter indices, and
wherein said prediction is obtained using two motion-compensations with two different motion vectors or references; and,
decoding said at least one video block using said filtered prediction.

16. A device comprising:
an apparatus according to claim 4; and
at least one of (i) an antenna configured to receive a signal, the signal including the video block, (ii) a band limiter configured to limit the received signal to a band of frequencies that includes the video block, and (iii) a display configured to display an output representative of a video block.

17. The apparatus of claim 15, wherein said filter index is a function of relative portions of two or more partitions comprising said video block.

18. The apparatus of claim 15, wherein a different filtering index is applied when bi-partitioning areas do not overlap.

* * * * *